United States Patent
Li et al.

(10) Patent No.: US 11,960,870 B2
(45) Date of Patent: Apr. 16, 2024

(54) CONTAINER IMAGE MANAGEMENT

(71) Applicant: International Business Machines Corporation, Armonk, NY (US)

(72) Inventors: Lu Yan Li, Beijing (CN); Zhan Peng Huo, Beijing (CN); Fei Tan, Beijing (CN); Jiu Chang Du, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 17/652,159

(22) Filed: Feb. 23, 2022

(65) Prior Publication Data
US 2023/0266955 A1    Aug. 24, 2023

(51) Int. Cl.
*G06F 8/61* (2018.01)

(52) U.S. Cl.
CPC ...................... *G06F 8/63* (2013.01)

(58) Field of Classification Search
CPC ....................................................... G06F 8/63
See application file for complete search history.

(56) References Cited

U.S. PATENT DOCUMENTS

| | | | |
|---|---|---|---|
| 9,569,455 B1 | 2/2017 | Bono | |
| 10,140,159 B1 | 11/2018 | Thomason | |
| 10,324,708 B2 * | 6/2019 | Griffin | G06F 8/65 |
| 10,534,671 B1 | 1/2020 | Zhao | |
| 10,877,739 B1 * | 12/2020 | Fernandez | G06F 9/455 |
| 2018/0095973 A1 * | 4/2018 | Huang | G06F 16/1748 |
| 2019/0354389 A1 * | 11/2019 | Du | G06F 9/45545 |
| 2020/0004556 A1 * | 1/2020 | Wong | G06F 9/45558 |
| 2020/0073649 A1 * | 3/2020 | Viana | G06F 9/45504 |
| 2020/0142680 A1 * | 5/2020 | Varadharajan Kannan | G06F 8/63 |
| 2020/0150940 A1 * | 5/2020 | Li | G06F 8/443 |
| 2020/0272427 A1 | 8/2020 | Wang | |
| 2020/0285353 A1 * | 9/2020 | Rezazadeh Sereshkeh | G06F 3/167 |
| 2020/0409736 A1 * | 12/2020 | Starks | G06F 9/44589 |
| 2021/0064351 A1 * | 3/2021 | Naganuma | G06F 8/63 |
| 2021/0109841 A1 * | 4/2021 | Li | G06F 11/3688 |

(Continued)

FOREIGN PATENT DOCUMENTS

| | | | |
|---|---|---|---|
| CN | 112799688 A | * | 5/2021 |
| CN | 112948099 A | * | 6/2021 |

(Continued)

OTHER PUBLICATIONS

Nathan et al., "CoMICon: A Co-operative Management System for Docker Container Images", 2017, IEEE (Year: 2017).*

(Continued)

*Primary Examiner* — Wei Y Zhen
*Assistant Examiner* — Junchun Wu
(74) *Attorney, Agent, or Firm* — Stephen R. Yoder

(57) ABSTRACT

Methods, systems, and computer program products for container image management are disclosed. In a method, a first group of operations that are performed in respective layers in a base image are obtained. A second group of operations that are performed in respective layers not comprised in the base image are obtained. The second group of operations are optimized based on a comparison between the first and second groups of operations. A destination container image is generated based on the optimized second group of operations and the base image.

17 Claims, 14 Drawing Sheets

(56) References Cited

U.S. PATENT DOCUMENTS

| | | | | |
|---|---|---|---|---|
| 2021/0311758 A1* | 10/2021 | Cao | ............................ | G06F 8/70 |
| 2021/0382846 A1* | 12/2021 | Miller | ............... | G06F 15/17331 |
| 2023/0027902 A1* | 1/2023 | Chao | ......................... | G06F 8/36 |

FOREIGN PATENT DOCUMENTS

| | | | | | |
|---|---|---|---|---|---|
| CN | 113535321 A | | 10/2021 | | |
| CN | 114157674 A | * | 3/2022 | | |
| CN | 113031971 B | * | 4/2022 | ............... | G06F 8/63 |
| WO | WO-2021208844 A1 | * | 10/2021 | | |

OTHER PUBLICATIONS

Han et al., "Container Image Access Control Architecture to Protect Applications", Sep. 2020, IEEE Access (Year: 2020).*

Steenken et al., "Container terminal operation and operations research—a classification and literature review", 2004, Spectrum (Year: 2004).*

Pahl et al., "Containers and Clusters for Edge Cloud Architectures—a Technology Review", 2015, IEEE (Year: 2015).*

Syed et al., "The Container Manager Pattern", Jul. 2017, ACM (Year: 2017).*

"Docker build | Docker Documentation", accessed on Jan. 27, 2022, 14 pages, <https://docs.docker.com/engine/reference/commandline/build/>.

"Wagoodman/dive: A tool for exploring each layer in a docker image", GitHub, accessed on Jan. 27, 2022, 14 pages, <https://github.com/wagoodman/dive>.

Mell et al., "The NIST Definition of Cloud Computing", National Institute of Standards and Technology U.S. Department of Commerce, Special Publication 800-145, Sep. 2011, 7 pages.

"Patent Cooperation Treaty PCT Notification of Transmittal of the International Search Report and the Written Opinion of the International Searching Authority, or the Declaration", Applicant's file reference IEEE232025PCT, International application No. PCT/CN2023/073620, International filing date Jan. 28, 2023, dated May 10, 2023, 7 pages.

* cited by examiner

1400

```
"RootFS": {
    "Type": "layers",
    "Layers": [
        "sha256:5153e1acaabce0d87adbf4a717bdc5e26cf86d851330830589a6b2bf5ede30ee",
        "sha256:a5d4bacb035190f03e3e1dc36846fd3db0f6773f4823f2a85fc59351af78574a",
        "sha256:5153e1acaabce0d87adbf4a717bdc5e26cf86d851330830589a6b2bf5ede30ee",
    ]
},
"Labels": null,
"Annotations": {},
"ManifestType": "application/vnd.oci.image.manifest.v1+json",
"User": "",
"History": [
    {
        "created": "2021-04-30T03:09:24.831634995Z",
        "created_by": "/bin/sh -c npm install pm2 -g" "version" : "1.1.3"
    },                                                                          ── 1410
    {
        "created": "2021-04-30T03:09:27.6397052862Z",
        "created_by": "/bin/sh -c #(nop) EXPOSE 6666",                          ── 1420
        "empty_layer": true
    },
    {
        "created": "2021-06-01T08:51:03.30158029Z",
        "created_by": "/bin/sh -c npm install pm2 -g" "version" : "1.1.3"       ── 1430
    }
]
```

```
"RootFS": {
    "Type": "layers",
    "Layers": [
        "sha256:5153e1acaabce0d87adbf4a717bdc5e26cf86d851330830589a6b2bf5ede30ee",
        "sha256:a5d4bacb035190f03e3e1dc36846fd3db0f6773f4823f2a85fc59351af78574a",
    ]
},
"Labels": null,
"Annotations": {},
"ManifestType": "application/vnd.oci.image.manifest.v1+json",
"User": "",
"History": [                                                    ── 1510
    {
        "created": "2021-04-30T03:09:24.831634995Z",
        "created_by": "/bin/sh -c npm install pm2 -g"
    },
    {
        "created": "2021-04-30T03:09:27.6397052862Z",
        "created_by": "/bin/sh -c #(nop) EXPOSE 6666",
        "empty_layer": true
    },
]
```

*FIG. 15*

CONTAINER IMAGE MANAGEMENT

BACKGROUND OF THE INVENTION

The present invention relates to container image management, and more specifically, to methods, systems and computer program products for generating an optimized destination container image.

Container technology is widely used in micro-service architecture, and it is recognized as a lightweight and agile way to develop, build and deploy applications. Usually, a container image is generated based on a base layer comprising a base image and one or more upper layers. The base layer provides base operation(s) related to an operation system, a network system, and the like, and the one or more upper layers may provide additional operation(s) for implementing a specific purpose of the container image. The container image may be generated in an iteration way and thus an architecture of the container image may be complicated and the data amount may be increased.

SUMMARY

In a first aspect of the present invention, there is provided a computer-implemented method that may be implemented by one or more processors in a computer system. In the method, the computer system obtains a first group of operations that are performed in respective layers comprised in a base image. The computer system obtains a second group of operations that are performed in respective layers not comprised in the base image. The computer system optimizes the second group of operations based on a comparison between the first and second groups of operations. Further, the computer system generates a destination container image based on the optimized second group of operations and the base image. With these embodiments, operation(s) in the second group of operations that leads to a potential waste in the storage space may be found by the comparison. Then, the operation(s) may be optimized for generating the destination container image. Therefore, the destination container image may involve less data amount and thus the storage efficiency may be increased. Further, due to the reduced data amount of the destination container image, potential costs in time resources and computing resources for further processing the destination container image may also be reduced.

According to embodiments of the present invention, the optimizing comprises two aspects: deleting a repeated operation and combining associated operations. In order to delete the repeated operation, with respect to an operation in the second group of operations, the computer system compares the operation in the second group of operations with the first group of operations. In response to the operation being repeated with one of the first group of operations, the computer system deletes the operation from the second group of operations. With these embodiments, the repeated operation that is shared by the first and second groups of operations may be easily found and removed from the second group of operations, and thus the destination container image will not comprise the repeated operation any more. At this point, operations in the destination container image do not comprise redundant content, which leads to a reduced data amount of the destination container image.

According to embodiments of the present invention, in order to compare the operation with the first group of operations, the computer system classifies the operation into a first type or a second type, the first type representing an operation changing the destination container image, and the second type representing an operation not changing the destination container image. The computer system processes the two types respectively. Specifically, in response to the operation being classified as the first type, the computer system compares the operation with the first group of operations. Alternatively, in response to the operation being classified as the second type, the computer system deletes the operation. With these embodiments, only operations that change the destination container image are subjected to the comparison, while operations that do not change the destination container image are omitted. Therefore, the to-be-compared operations may be reduced and thus the performance for generating the destination container image may be further increased.

According to embodiments of the present invention, in order to compare the operation with the first group of operations, the computer system determines a layer object digest for a layer object that is operated by the operation. Further, the computer system compares the layer object digest for the layer object that is operated by the operation with each of layer object digests for a group of layer objects that are operated by the first group of operations, respectively. In response to the layer object digest for the layer object that is operated by the operation being identical to any of the group of layer object digests for the group of layer objects that are operated by the first group of operations, the computer system determines that the operation is repeated with one of the first group of operations. With these embodiments, the digests may be used as grounds for the comparison, and thus the complicity level for the comparison may be greatly reduced.

According to embodiments of the present invention, in order to determine the layer object digest for the layer object that is operated by the operation, the computer system determines the layer object digest based on a version of the application in response to the layer object that is operated by the operation being an application to be installed by the operation. The computer system determines the layer object digest based on a digest of the node (such as a file or a directory in the file system) in response to the layer object that is operated by the operation being a node to be managed by the operation in a file system related to the destination container image. With these embodiments, different types of layer objects may be considered in the comparison, such that a corresponding attribute of the layer object may be selected for determining the digest. Therefore, the digest may accurately reflect whether the two operations under the comparison are the same or not.

According to embodiments of the present invention, the computer system receives the first group of operations from a container builder file from which the destination container image is generated. Further, the computer system extracts the second group of operations from the container builder file. With these embodiments, embodiments of the present invention may support a way for generating the destination container image from a container builder file. Therefore, existing container builder files that are generated by existing container builder file generation tools may be optimized according to embodiments of the present invention.

According to embodiments of the present invention, the computer system classifies the operation of the first type into a third type or a fourth type, the third type representing an operation that produces the same result whenever the operation is performed, and the fourth type representing an operation that does not always produce the same different result when the operation is performed at different time points. The computer system processes the two types respectively. Specifically, the computer system combines the operation with a further operation in the second group of operations in response to the operation being classified as the third type, the further operation being classified as the third type. Alternatively, the computer system compares the operation with the first group of operations in response to the operation being classified as the fourth type. With these embodiments, operations related to different situations may be subject to different optimization procedures, which may further increase the performance of the container image management.

According to embodiments of the present invention, the computer system receives the first group of operations from a running container. Further, the computer system obtains the second group of operations from a group of commands that are inputted in the running container. With these embodiments, embodiments of the present invention may support a way for generating the destination container image from a container. Therefore, existing images that are edited by existing tools may be optimized according to embodiments of the present invention.

According to embodiments of the present invention, in order to combine associated operations, the computer system determines a plurality of operations in the second group of operations that have an association relationship based on the comparison. The computer system combines the plurality of operations into a new operation, and then replaces the plurality of operations in the second group of operations with the new operation. With these embodiments, associated operations may be combined for further reducing the potential waste in the storage space.

According to embodiments of the present invention, the computer system receives a source container image from which the destination container image is generated. In order to obtain the first group of operations, the computer system obtains the first group of operations from a base image of the source container image. Further, in order to obtain the second group of operations, the computer system obtain the second group of operations in the source container image. In addition to generating a new destination container image, there is provided a way for optimizing an existing source container image. Therefore, repeated content comprised in the source container image may be removed for generating a destination container image that excludes the repeated content.

In a second aspect of the present invention, there is provided a computer-implemented system. The computer-implemented system comprises a computer processor coupled to a computer-readable memory unit, where the memory unit comprises instructions that when executed by the computer processor implements the method according to the first aspect of the present invention.

In a third aspect of the present invention, there is provided a computer program product. The computer program product comprises a computer readable storage medium having program instructions embodied therewith. The program instructions are executable by an electronic device to cause the electronic device to perform actions of the method according to the first aspect of the present invention.

BRIEF DESCRIPTION OF THE SEVERAL VIEWS OF THE DRAWINGS

FIG. 14 depicts an example structure for a container builder file according to embodiments of the present invention.

FIG. 15 depicts an example structure for an optimized container image according to embodiments of the present invention.

DETAILED DESCRIPTION

Figure 1:
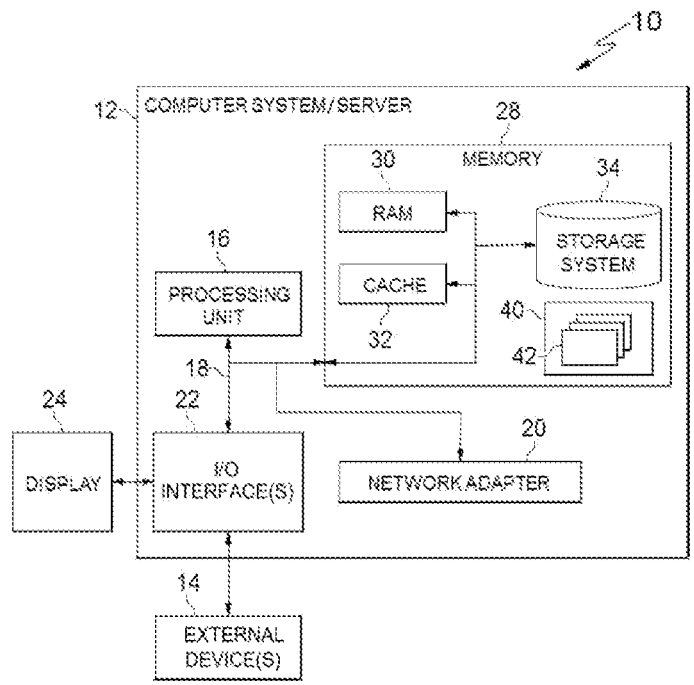
FIG. 1 depicts a cloud computing node according to embodiments of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure comprises a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may comprise at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure comprising network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure comprising networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can comprise operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that comprises a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computer system environments or configurations. Examples of well-known computer systems, environments, and/or configurations that may be suitable for use with computer system/server 12 comprise, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that comprise any of the above systems or devices, and so on.

Computer system/server 12 may be described in the general context of computer system-executable instructions, such as program modules, being executed by a computer system. Generally, program modules may comprise routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media comprising memory storage devices.

As shown in FIG. 1, computer system/server 12 in cloud computing node 10 is shown in the form of a general-purpose computing device. The components of computer system/server 12 may comprise, but are not limited to, one or more processors or processing units 16, a system memory 28, and a bus 18 that couples various system components comprising system memory 28 to processor 16.

Bus 18 represents one or more of any of several types of bus structures, comprising a memory bus or memory controller, a peripheral bus, an accelerated graphics port, and a processor or local bus using any of a variety of bus architectures. By way of example, and not limitation, such architectures comprise Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically comprises a variety of computer system readable media. Such media may be any available media that is accessible by computer system/server 12, and it comprises both volatile and non-volatile media, removable and non-removable media.

System memory 28 can comprise computer system readable media in the form of volatile memory, such as random access memory (RAM) 30 and/or cache memory 32. Computer system/server 12 may further comprise other removable/non-removable, volatile/non-volatile computer system storage media. By way of example only, database system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may comprise at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may comprise an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, comprise, but are not limited to: microcode, device drivers, redundant processing units, external disk drive arrays, RAID systems, tape drives, and data archival database systems, etc.

Figure 2:
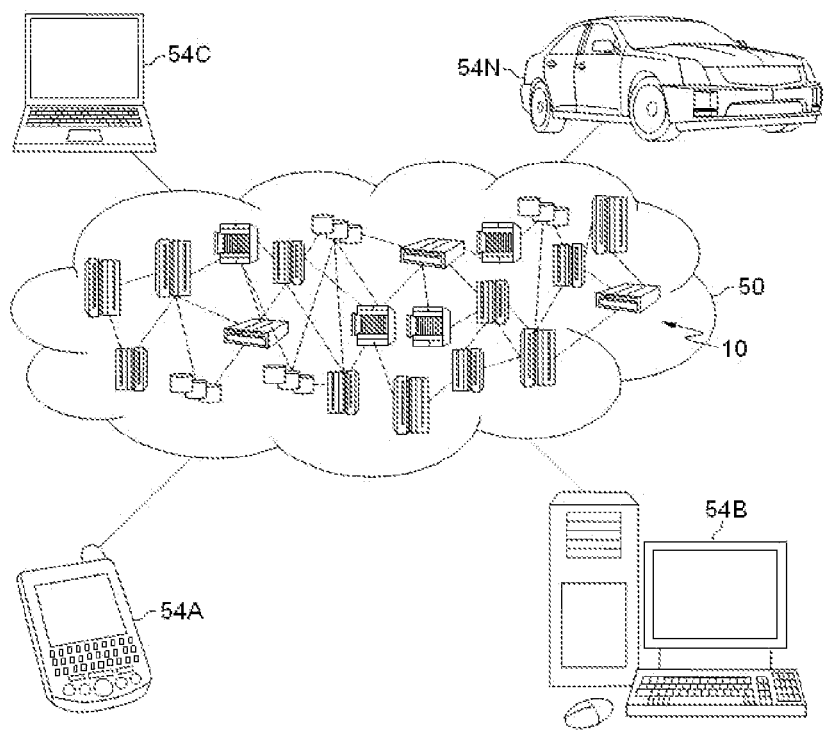
FIG. 2 depicts a cloud computing environment according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
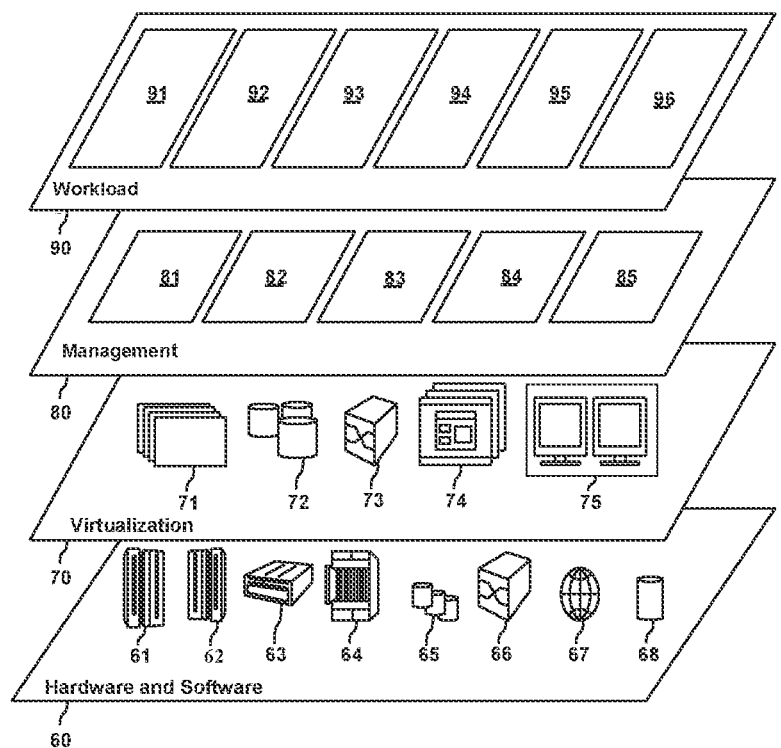
FIG. 3 depicts abstraction model layers according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 comprises hardware and software components. Examples of hardware components comprise: mainframes 61; RISC (Reduced Instruction Set Computer) architecture based servers 62; servers 63; blade servers 64; storage devices 65; and networks and networking components 66. In some embodiments, software components comprise network application server software 67 and database software 68.

Virtualization layer 70 provides an abstraction layer from which the following examples of virtual entities may be provided: virtual servers 71; virtual storage 72; virtual networks 73, comprising virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer comprise: mapping and navigation 91; software development and lifecycle management 92; virtual classroom education delivery 93; data analytics processing 94; transaction processing 95; and container image processing 96.

It should be noted that the container image processing 96 according to embodiments of the present invention could be implemented by computer system/server 12 of FIG. 1. In the context of the present invention, a container image may refer to an image that may be deployed in a container. Based on a generation procedure, the container image may be generated from a container builder file or a running container.

Figure 4:
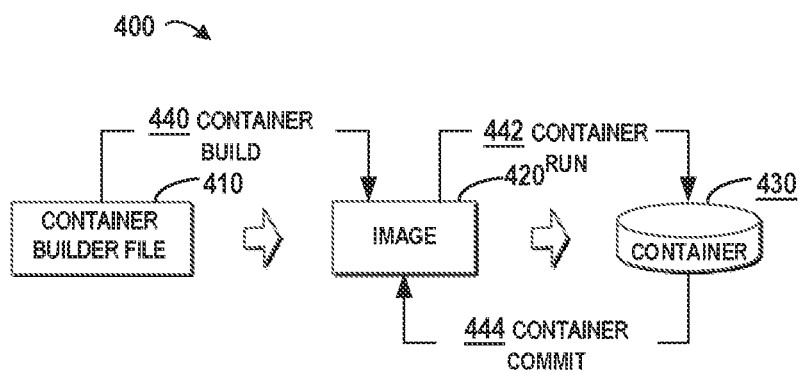
FIG. 4 depicts an example environment for generating a container image from a container builder file or an instance loaded in a container to which embodiments of the present invention may be implemented.

Reference will be made to FIG. 4 for a brief description of a working environment 400 of the invention. FIG. 4 depicts an example environment for generating a container image 420 from a container builder file 410 or an instance loaded in a container 430 to which embodiments of the present invention may be implemented. As shown in FIG. 4, usually there are two ways to have an application running in the container 430. In the first way, a container builder file 410 comprising the base image and one or more upper layers maybe used to generate the container image 420 via container build 440. Here, software engineers may edit the container builder file 410 to change the function of the container image 420. In the second way, the container image 420 may be loaded into a container 430 via container run 442, and then the engineers may edit the loaded instance of the container image 420 in the container 430. Further, a new version of image, i.e., an updated container image 420, may be generated via container commit 444. According to FIG. 4, the container image 420 may be generated by any of the container build 440 and the container commit 444.

Figure 5:
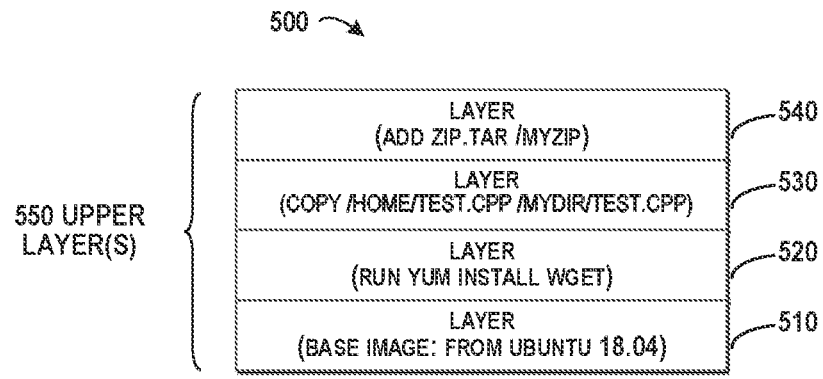
FIG. 5 depicts an example diagram for an architecture of a container image according to embodiments of the present invention.

Reference will be made to FIG. 5 for more details about the container image, FIG. 5 depicts an example diagram for an architecture of a container image 500 according to embodiments of the present invention. In FIG. 5, the container image 500 may comprise a plurality of layers 510, 520, 530 and 540, where the layer 510 (also referred to as a base layer) comprises a base image for installing an operating system (such as the Ubuntu 18.04). Further, the layers 520, 530, and 540 above the layer 510 may be referred to as upper layers 550. The layer 520 may run Yum to install wget, the layer 530 may implement a copy operation (such as "copy/home/test.cpp/mydir/test.cpp"), and the layer 540 may implement an add operation (such as add zip.tar/myzip). It is to be understood that the above FIG. 5 just provides an example architecture of the container image 500, in other embodiments, the container image 500 may have more or less layers for implementing different operations.

Figure 6:
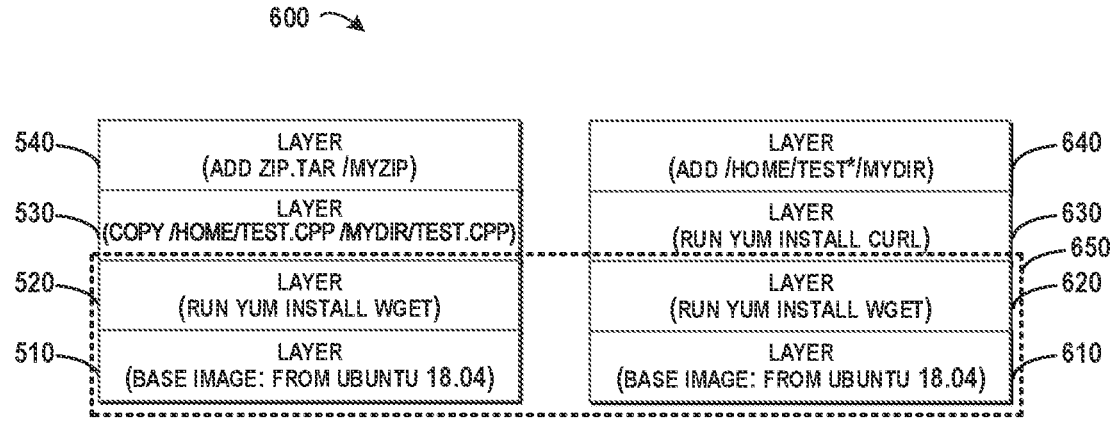
FIG. 6 depicts an example diagram for a comparison between two container images according to embodiments of the present invention.

With developments of the container technology and the software reuse technology, codes for implementing a specific operation may be packaged into an individual layer, and then the individual layer may be reused in a plurality of container images. However, layers with the same content may be repeated among container images, which in turns cost extra storage space and computing resource. FIG. 6 depicts an example diagram 600 for a comparison between two container images according to embodiments of the present invention. In FIG. 6, the container image on the left comprises the layers 510, 520, 530 and 540, and the container image on the right comprises the layers 610, 620, 630 and 640. Based on a comparison of these layers, the layer 510 is identical to the layer 610, and the layer 520 is identical to the layer 620. In other words, the two images share the same layers as indicated in a block 650. By now, solutions have been proposed for detecting the repeated layers between different container images, and then only one copy of the repeated layers are stored for reducing the storage cost.

Figure 7:
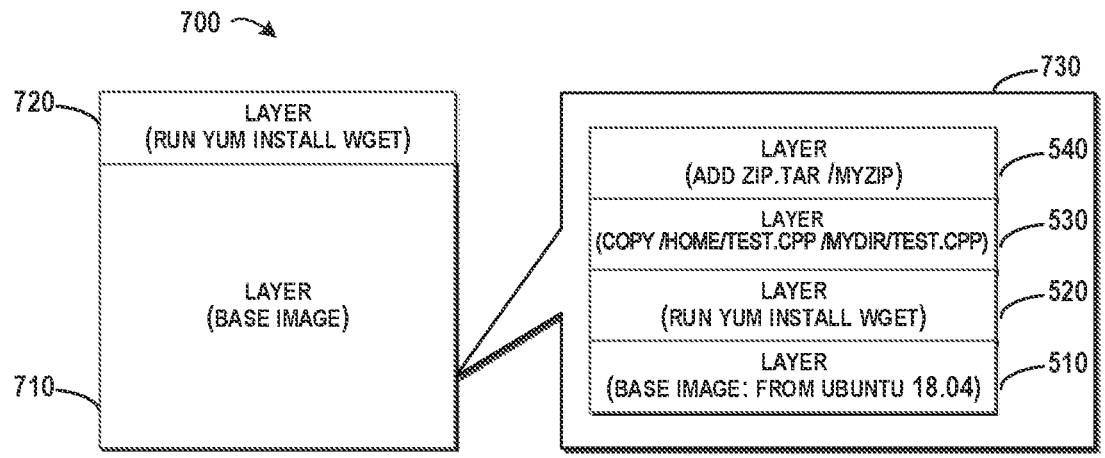
FIG. 7 depicts an example diagram for an architecture of a container image according to embodiments of the present invention.

Usually, the container image may be generated in an iteration way. For example, the container image 500 may be comprised as the base image in a layer of another container image. FIG. 7 depicts an example diagram for an architecture of a container image 700 according to embodiments of the present invention. In FIG. 7, the container image 700 comprises a layer 710 (comprising a base image) and a layer 720. The base image in the layer 710 is the container image 500 that comprises the layers 510, 520, 530, and 540. As shown in FIG. 7, the layer 520 in the base layer 710 and the layer 720 both relate to operations "run yum install wget." As these operations may lead to potential repeated files, these operations should be further analyzed. It is to be understood that the above container image 700 comprising only one repeated file in one layer is just a simplified example, in another example, the container image 700 may comprise more repeated files in more layers. Therefore, the data amount of the container image 700 may be greatly increased.

Figure 8:
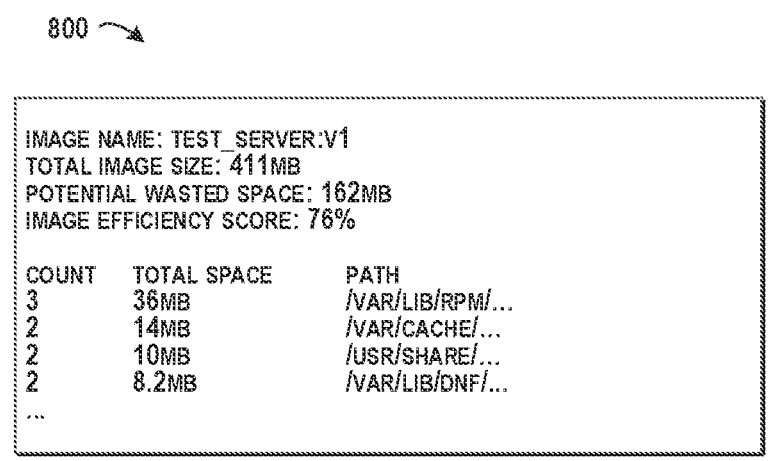
FIG. 8 depicts an example diagram for details of a container image that comprises repeated contents according to embodiments of the present invention.

FIG. 8 depicts an example diagram 800 for details of a container image that comprises more repeated files according to embodiments of the present invention. FIG. 8 shows that the total image size of the container image is 411 MB, while potential wasted space costed by the repeated files is 162 MB. Specifically, the container image comprises: 3 repeated files with a total space of 36 MB and a path of "Nar/lib/rpm/ . . . ," 2 repeated files with a total space of 14 MB and a path of "/var/cache/ . . . ," and so on. At this point, the image efficiency score is only 76%, which indicates that the repeated files greatly increase the storage cost and reduce the efficiency. Based on the above, it is desired to propose a solution for managing the container image in a more effective way.

Figure 9:
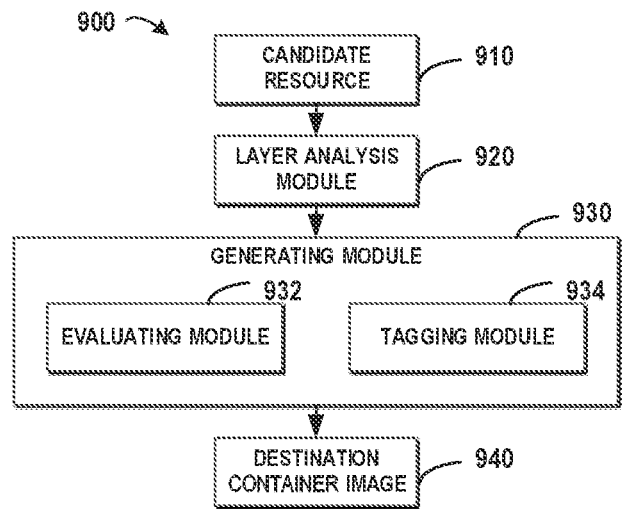
FIG. 9 depicts an example diagram for generating a destination container image according to embodiments of the present invention.

In view of the above drawbacks, embodiments of the present invention provide an intelligent method to automatically simplify the container images. Reference will be made to FIG. 9 for a brief of the present invention, here FIG. 9 depicts an example diagram 900 for generating a destination container image 940 according to embodiments of the present invention. In FIG. 9, a layer analysis module 920 and a generating module 930 may be provided for the container image management. These modules may be implemented by one or more processors of a computer system.

Here, a destination container image 940 may be generated from the candidate resource 910. Here, the candidate resource 910 refers to the resource from which the destination container image is generated. There may be two scenarios for generating the destination container image. In the first scenario, a completely new destination container image may be generated, and in the second scenario, a source container image may be optimized into a destination container image. In other words, in the first scenario, the candidate resource 910 may comprise a base layer and one or more upper layers (for example, defined by the user in a container builder file or in a running container), while in the second scenario, the destination container image may be an optimized to a new version of an existing source container image. At this point, the candidate resource 910 may refer to contents in the source container image. Hereinafter, reference will be made to FIG. 9 for more details in the first scenario, and details in the second scenario are similar.

Specifically, the candidate resource 910 may be inputted into the layer analysis module 920 for extracting a summary. The layer analysis module 920 may analyze layers in the candidate resource 910 according to the layer metadata, get installed packages list by aid of a container started for the base image, then generate the layer report summary (LRS) with three main categories: installed package list, idempotent operations and non-idempotent operations. For example, layers (comprising the base layer and upper layer(s)) in the candidate resource 910 may be analyzed. Specifically, the layer analysis module 920 may obtain operations in the base layer and the upper layer(s), the operations comprising a first group of operations (corresponding to the base image) that are performed in respective layers in a base image (the base image needs to be comprised in the destination container image 910), and a second group of operations (corresponding to the upper layer(s)) that are performed in respective layers not comprised in the base image. Here, the second group of operations may be edited by the user via the container build 440 or the container commit 444 in FIG. 4. Further, the layer report summary and the candidate resource 910 may be feed into the generating module 930 for generating the destination container image 940.

The generating module 930 may optimize the second group of operations based on a comparison between the first and second groups of operations and then generate the destination container image 940 based on the optimized second group of operations and the base image. Here, the generating module 930 may comprise an evaluating module 932 and/or a tagging module 934. The evaluating module 932 in the generating module 930 may be enabled if the candidate resource 910 is obtained from a container builder file (i.e., via the container build 440 in FIG. 4); while the tagging module 934 in the generating module 930 may be enabled if the candidate resource 910 is obtained from a container (i.e., via the container commit 444 in FIG. 4).

In embodiments of the present invention, the evaluating module 932 may classify operations defined in the container builder file based on the layer report summary. Specifically, the evaluating module 932 may classify the operations into two categories: an idempotent type and a non-idempotent type. The idempotent operation may always produce the same output with same operation, i.e., whenever the operation is performed, the idempotent operation always produces the same result. The non-idempotent operation may not always produce the same output with the same operation, i.e., the non-idempotent operation may produce different results when the operation is performed at different time points.

Further, the idempotent operations may be collected, and then processed by optimization mechanism based on the layer analysis summary to output the optimized operations. Regarding the non-idempotent operations, digests may be generated (for example, based on version detection or digest computation) for these operations for optimization. Herein, a digest of a content may uniquely identify a content of an object, or a file, etc. The digest of the content may be a watermark of the content, a hash value of the content, a signature of the content and the like. Then, the optimized operations may be used for generating the destination container image 940.

In embodiments of the present invention, the tagging module 934 may work together with the evaluating module 932 for processing container images that are generated via the container commit procedure. Specifically, the tagging module 934 may classify user's operations into two main categories: an impact type and a non-impact type. Here, the non-impact operations may be directly removed and the impact operations should be further processed. Regarding the impact operations, the tagging module 934 may generate digests for these operations (for example, based on version detection or digest computation), and then the tagging module 934 may optimize the impact operations based on the digests. Next, the tagging module 934 may generate the destination container image 940 according to the optimized operations.

With embodiments of the present invention, operation(s) in the second group of operations that leads to a potential waste in the storage space may be found by the comparison. Then, the operation(s) may be optimized for generating the destination container image 940. Therefore, the destination container image 940 may have a less data amount and thus the storage efficiency may be increased. Further, due to the reduced data amount of the destination container image 940, the potential cost in time resources and computing resources for further processing the destination container image 940 may also be reduced. Having provided the brief idea, hereinafter, reference will be made to FIGS. 10 to 20 for more details about the layer analysis module 920 and the generating module 930.

Figure 10:
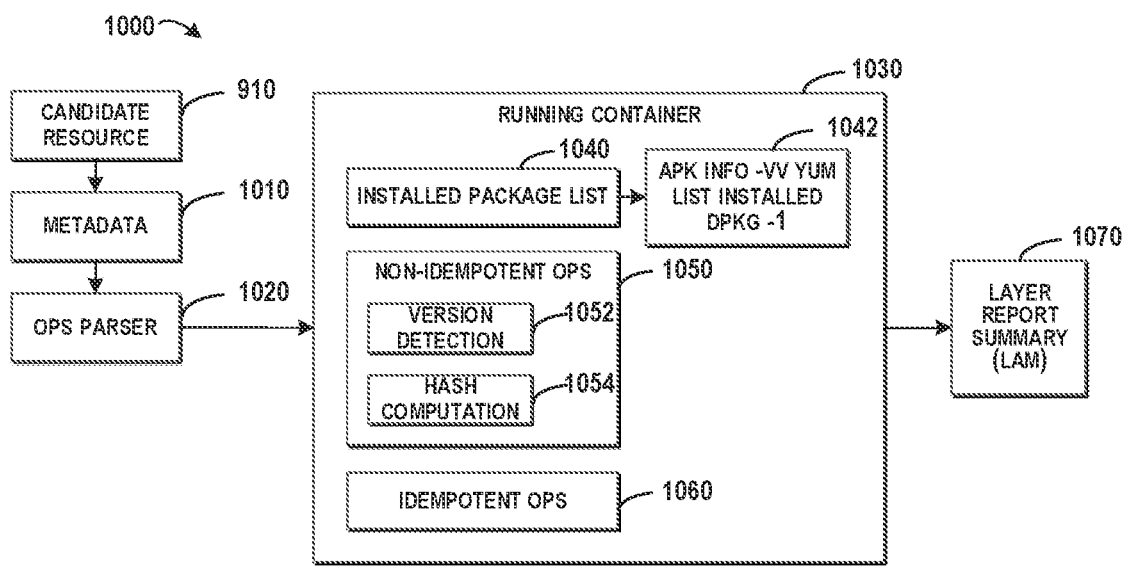
FIG. 10 depicts an example diagram for generating a layer report summary by a layer analysis module according to embodiments of the present invention.

FIG. 10 depicts an example diagram 1000 for generating a layer report summary 1070 by a layer analysis module 920 according to embodiments of the present invention. As shown in FIG. 10, in order to obtain the first group of operations, a running container 1030 may be launched for holding the base image defined in the candidate resource 910. Here, if the base image is generated by the container commit procedure, the base image may be deployed in the running container 1030, and then the first group of operations may be extracted from respective layers in the deployed base image. The base image is in a packaged format, and it may be extracted when it is deployed in the running container 1030. Alternatively, if the base image is generated by the container build procedure, then a container builder file defining the base image may be parsed for obtaining the first group of operations. With these embodiments, the first group of operations may be determined in an easy and effective way without a complicated analysis to the base image itself.

The layer analysis module 920 may analyze the candidate resource 910 and obtain metadata 1010. The metadata 1010 may comprise brief information of the candidate resource 910, such as a name, a size, layer(s) and so on. Further, an operation parser 1020 may analyze the information and extract the operations that are defined in the layer(s) of the base image and the upper layer(s). For example, system tools may be run to get installed package list and the detail information.

In the running container 1030, the installed package list 1040 may be obtained. For example, as indicated by a reference number 1042, the list may comprise "apk info -vv, yum list installed, dpkg -l." Further, operations may be extracted from the base image. Here, operations extracted from the base image may be taken as the first group of operations. Next, operations extracted from the upper layers may be taken as the second group of operations. Further, the extracted operations (comprising the first and second groups of operations) may be compared and optimized.

It is known that if an operation changes the destination container image (for example, operations in the container builder file related to installation, copy, or configuration), then the operation should be subjected to further processing. If an operation does not change the destination container image (for example, the user just view the candidate resource 910 in the container but does not change anything), then the operation can be omitted. Therefore, the extracted operations may be classified into a first type or a second type, the first type represents an operation changing the destination container image, and the second type represents an operation not changing the destination container image. If the operation is classified as the first type, the computer system compares the operation with the first group of operations. If the operation is classified as the second type, the computer system deletes the operation. With these embodiments, only operations that change the destination container image are subjected to the comparison, while operations that do not change the destination container image are omitted. Therefore, the to-be-compared operations may be reduced and thus the performance for generating the destination container image 940 may be further increased.

According to embodiments of the present invention, the above classifying procedure may be implemented at different time points during the container image management. If the candidate resource 910 is defined in a container builder file by the user, usually, it is assumed that all the operations in the container builder file are for generating the destination container image 940, and thus all the operations in the container builder file may be classified into the first type. If the candidate resource 910 is obtained from a container, the user's operations may or may not change the container image, and thus these operations should be classified further.

According to embodiments of the present invention, the layer analysis module 910 may classify the remaining operations (i.e., operations of the first type) into a third type or a fourth type, the third type represents an operation that produces the same result whenever the operation is performed, and the fourth type represents an operation that does not always produce the same result when the operation is performed at different time points. In order to increase the performance, only operations of the first type may be subjected to the above further classifying procedure. If the operation is classified as the third type, the computer system combines the operation with a further operation in the second group of operations, here the further operation is also classified as the third type. If the operation is classified as the fourth type, the computer system compares the operation with the first group of operations. With these embodiments, operations related to different types may be provided to different optimization procedures, which may further increase the performance of the container image management.

Figure 11:
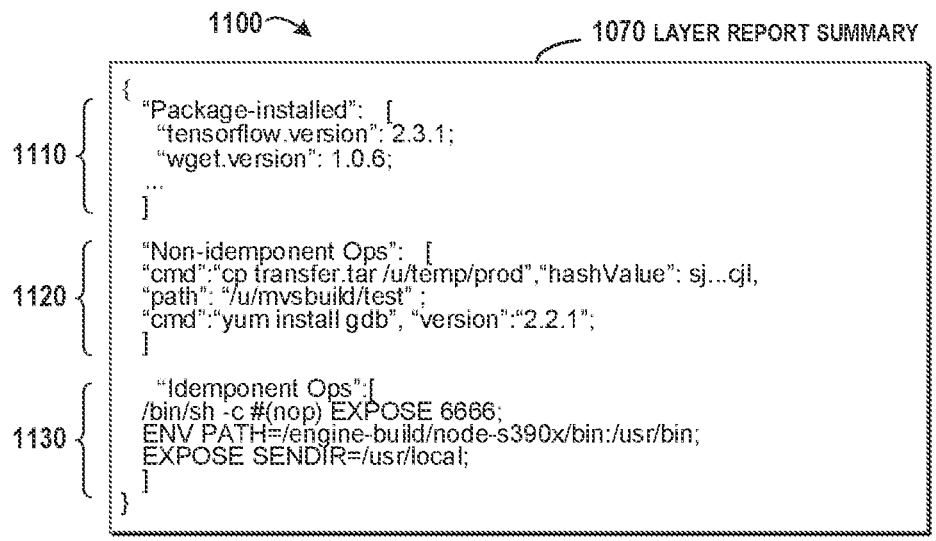
FIG. 11 depicts an example diagram for a layer report summary according to embodiments of the present invention.

As shown in FIG. 10, the extracted operations may be classified as the non-idempotent operations 1050 (i.e., the fourth type) or the idempotent operations 1060 (i.e., the third type). For the non-idempotent operations 1050, there are two modules, i.e., a version detection 1052 and a digest computation 1054 to process them. Further, the layer analysis module 920 may generate the layer report summary 1070 based on the package list and all the above operations. Referring to FIG. 11 for more details about the layer report summary 1070. FIG. 11 depicts an example diagram 1100 for a layer report summary 1070 according to embodiments of the present invention. In FIG. 11, the layer report summary 1070 may comprise three segments 1110, 1120 and 1130. Here, the segment 1110 may represent package(s) that are installed. For example, the following packages are installed: "tensorflow" with a version of "2.3.1," "wget" with a version of "1.0.6," and so on.

In FIG. 11, the segment 1120 indicates that the non-idempotent operations comprise: "cmd":"cp transfer.tar/u/temp/prod","hashValue": sj . . . cjl, "path": "/u/mvsbuild/test"; "cmd":"yum install gdb", "version":"2.2.1". The segment 1130 indicates that idempotent operations comprise: /bin/sh -c #(nop) EXPOSE 6666; ENV PATH=/engine-build/node-s390x/bin:/usr/bin; EXPOSE SENDIR=/usr/local. Further, the layer report summary 1070 may be inputted into the generating module 930 for further processing.

As described in the previous paragraphs, the generating module 930 may comprise the evaluating module 932 and/or the tagging module 934 for processing container images that are generated from different ways. The following paragraphs will provide more details for the above two modules respectively. According to embodiments of the present invention, the evaluating module 932 may receive the candidate resource 910 from a container image related to a container builder file from which the destination container image 940 is generated. At this point, the evaluating module 932 may extract the second group of operations from the container builder file. With these embodiments, the present invention may support a way for generating the destination container image based on the container image related to the container builder file. Therefore, existing container builder files that are generated by existing tools may be optimized according to embodiments of the present invention.

Figure 12:
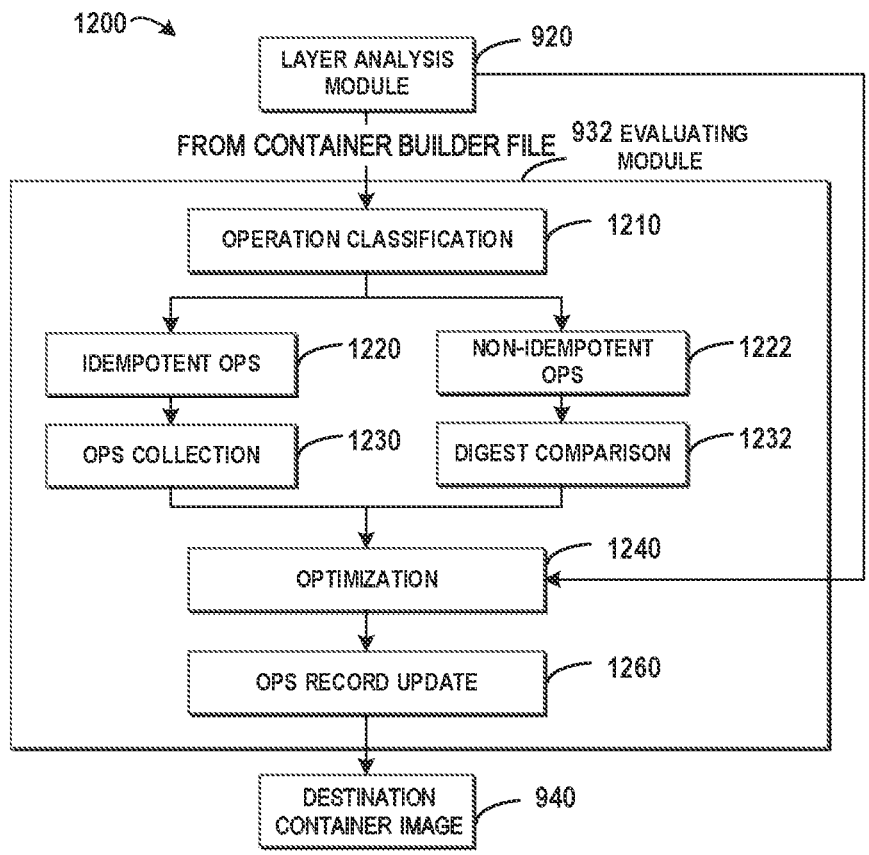
FIG. 12 depicts an example diagram for generating a destination container image by an evaluating module according to embodiments of the present invention.

FIG. 12 depicts an example diagram 1200 for generating a destination container image by an evaluating module 932 according to embodiments of the present invention. The evaluating module 932 in the generating module 930 may be enabled if content related to the upper layers in the candidate resource 910 is obtained from a container builder file. When the evaluating module 932 is enabled, the layer report summary 1070 may be inputted into the evaluating module 932. Here, the evaluating module 932 may optimize the operations via different branches.

According to embodiments of the present invention, the optimizing may comprise two aspects: deleting a repeated operation and combining associated operations. As shown in FIG. 12, at a block 1210, an operation classification may be used to implement the operations. If an operation belongs to the idempotent type, then the left branch in the evaluating module 932 may be enabled. At a block 1220, the idempotent operation may be collected for further processing. For example, the segment 1130 in FIG. 11 may be subjected to the operation collection 1230. At a block 1222, the non-idempotent operations may be feed to a digest comparison 1232 to compare corresponding digests for the objects that are operated by these operations each other. For example, the segment 1120 in FIG. 11 may be feed to the digest comparison 1232. If an operation aims at installing an application, a digest corresponding the operation may be generated based on a version of the to-be-installed application. In another example, if an operation aims at managing a node in a file system related to the destination container image 940, then a digest corresponding to the operation may be generated based on a digest of the node.

Further, the layer report summary 1070 and results of the operation collection 1230 and digest comparison 1232 may be feed into a block 1240 for optimization and then into a block 1260 for operation record update. Afterwards, the updated operation record may be used in generating the destination container image 940.

Figure 13:
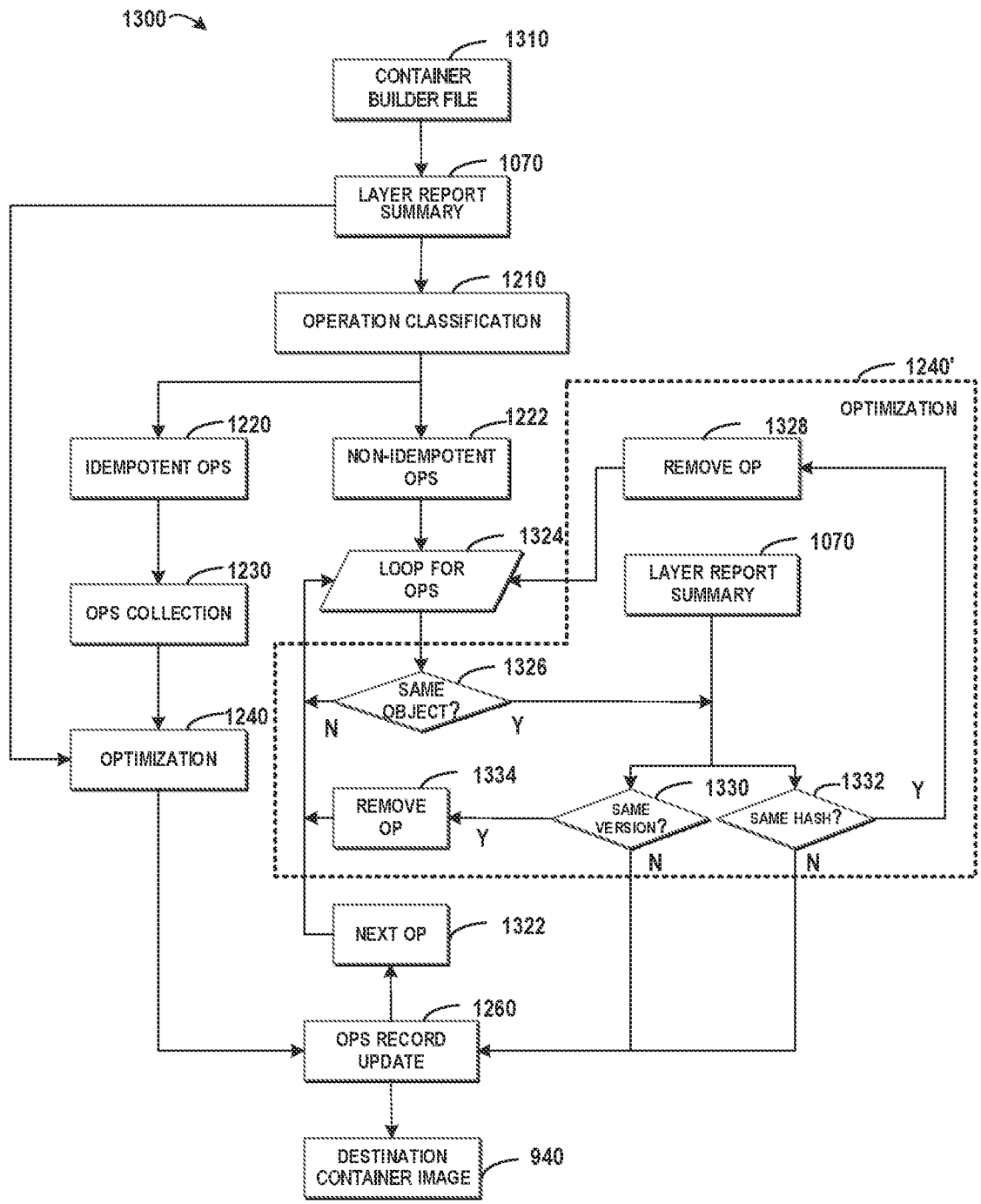
FIG. 13 depicts an example flowchart of a method for generating a destination container image by an evaluating module according to embodiments of the present invention.

Hereinafter, reference will be made to FIG. 13 for more details about the evaluation module 932 for processing a container builder file. FIG. 13 depicts an example flowchart of a method 1300 for generating a destination container image according to embodiments of the present invention. In FIG. 13, a container builder file 1310 may be analyzed by the layer analysis module 920 to obtain the layer report summary 1070. Further, at the block 1210, the classified operations may be provided to different branches for further processing. Specifically, the idempotent operations 1220 may go through the left branch and the non-idempotent operations 1224 may go through the right branch.

In embodiments of the present invention, the idempotent operation produces the same result whenever the operation is performed. For example, the following operation in the container builder file may be classified as an idempotent operation: "/bin/sh -c #(nop) EXPOSE 6666." Further, the non-idempotent operation represents an operation producing different results when the operation is performed at different time points. Referring to a command operation: "Thin/sh -c npm install pm2 -g," this command operation indicates a default latest version for "pm2" that is to be installed. However, the version may change as the time changes, so this command operation may be classified as a non-idempotent operation. Similarly, the command operation "Thin/sh", which indicates the user operations in the container are bash commands, may also be classified as a non-idempotent operation.

Still referring to FIG. 13, the following paragraphs will describe how to process the idempotent operations (see the left branch that follows the block 1220) and the non-idempotent operations (see the right branch that follows the block 1222). According to embodiments of the present invention, the idempotent operations may be optimized (i.e., combined). Specifically, the evaluating module 942 determines a plurality of operations in the second group of operations that have an association relationship based on the comparison, and then combines the plurality of operations into a new operation to replace the original ones. With these embodiments, associated operations may be combined for further reducing the potential waste in the storage space.

At a block 1230, the idempotent operations are collected from the container builder file 1310, and then the collected idempotent operations are subjected to an optimization 1240 based on the layer report summary 1070. After the optimization, the operations are updated to a simplified version and feed to a block 1260. Therefore, after the operation record update 1260, the destination container image 940 may be generated in a more effective way.

If the operation is classified as the non-idempotent operations at the block 1222, these operations may go through the right branch for deleting the repeated operation. Specifically, the evaluating module 942 deletes, from the second group of operations, a repeated operation that is repeated with an operation in the first group of operations based on the comparison. With these embodiments, the repeated operation(s) that is shared by the first and second groups of operations is deleted, and then the destination container image 940 will not comprise the repeated operation(s) any more.

According to embodiments of the present invention, in order to delete the repeated operation from the second group of operations, the evaluating module 932 may compare each operation in the second group of operations with the first group of operations. Therefore, the right branch involves a loop procedure, where each operation may be looped at a block 1324 for finding the repeated operations. If the two operations operate the same object with the same digest, then the two operations may be identified as repeated operations. Referring to the block 1326 for more details, each operation in the second group of operations may be compared with each operation in the first group of operations. If the two operations relate to the same object in a block 1326, then method 1300 proceeds to further comparison in a block 1330 or 1332 (i.e., to remove repeated operations); otherwise, the method 1300 proceeds to the block 1324 for the next operation. If the operation is repeated with one of the first group of operations, the evaluating module 942 deletes the operation from the second group of operations. With these embodiments, the repeated operation may be easily found and then removed from the second group of operations.

As shown in FIG. 13, the optimization indicated by a block 1240' comprises multiple blocks. During the optimization, if operations respectively from the first and second groups operate the same object, the method 1300 may proceed to the block 1330 or 1332 (which implements corresponding optimization to the non-idempotent operations according to the layer object types, respectively) based on the layer report summary 1070. Further, digests of the objects may be compared to determine whether digests for the to-be-operated objects are the same. According to embodiments of the present invention, in order to compare the operation with the first group of operations, the evaluating module 932 determines a layer object digest for a layer object that is operated by the operation. Further, the evaluating module 932 compares the layer object digest for the layer object that is operated by the operation with each of layer object digests for a group of layer objects that are operated by the first group of operations, respectively. If the layer object digest for the layer object that is operated by the operation is identical to any of the group of layer object digests for the group of layer objects that are operated by the first group of operations, the evaluating module 932 determines that the operation is repeated with one of the first group of operations. With these embodiments, the digests may be used as grounds for the comparison, and then the complexity level for the comparison may be greatly reduced.

Generally, the objects that are operated by the non-idempotent operations comprise two types: an application to be installed by the operation, and a node to be managed by the operation in a file system related to the destination container image 940. The method 1300 may handle the above two types in individual procedures. Referring to a block 1330, if the layer object that is operated by the operation is an application to be installed by the operation, the evaluating module 932 may determine the layer object digest based on a version of the application. For example, the version "2.2.1" in the segment 1120 in FIG. 11 may be used as the digest for the operation "yum install gdb, version: 2.2.1."

At the block 1330, if the two operations relate to the same version, then the method 1300 may proceed to a block 1334 and remove the operation from the second group of operations. Further, the method 1300 may return to the block 1324 for processing a next operation in the second group of operations. At the block 1330, if the two operations relate to different versions, then the method 1300 may proceed to a block 1260. With these embodiments, different types of layer objects may be considered in the comparison, such that a corresponding attribute of the layer object may be selected for determining the digest. Therefore, the digest may accurately reflect whether the two operations under the comparison are the same or not.

In embodiments of the present invention, if the layer object that is operated by the operation is a node to be managed by the operation in a file system related to the destination container image 940, the evaluating module 932 may determine the layer object digest based on a digest of the node. For example, if the operation aims at copying a file, then a hash value of the to-be-copied file may be taken as the digest. At the block 1332, if the two operations have the same hash value, then the method 1300 may proceed to a block 1328 and remove the operation from the second group of operations. Further, the method 1300 may return to the block 1324 for processing a next operation in the second group of operations. At the block 1332, if the two operations relate to different hash values, then the method 1300 may proceed to the block 1260. With these embodiments, all the operations in the destination container image do not comprise redundant content, which leads to a reduced data amount of the destination container image.

After the above blocks, the operations record is updated at the block 1260. For example, the operations record may describe brief information of processing that is made to the operations and/or additional information during processing (such as the related version and/or hash). Then, the method 1300 may proceed to a block 1322 for processing the next operation in the second group of operations. Detailed steps for processing the next operation are similar to the above procedure and thus details may be omitted. With the above steps, the idempotent operations may be optimized and updated to a simplified version. Therefore, after the operation record update 1260 for all operations comprising the idempotent operations and the non-idempotent operations, as shown as the dash line, the method 1300 may proceed to for generating the destination container image 940, and the destination container image 940 may be generated in a more effective way.

Having described detailed steps in the method 1300, hereinafter, reference will be made to FIG. 14 for an example for processing a specific container builder file. FIG. 14 depicts an example structure 1400 by parsing a container image according to embodiments of the present invention. Here, the container image may be parsed, for example, by a command "container inspect." As shown in FIG. 14, the example structure 1400 comprises three layers, where a segment 1410 indicates a base layer, a segment 1420 and a segment 1430 indicate two upper layers, respectively. Based on the above method 1300, respective digests may be generated for operations in the above segments 1410, 1420, and 1430, and then the digests for the segment 1420 and 1430 may be compared with the digest for the segment 1410, respectively. As both of the segment 1410 and 1430 comprise operations for installing "pm2 -g" with the same version "1.1.3," the segment 1430 may be removed from the second group of operations.

FIG. 15 depicts an example structure 1500 for an optimized container image according to embodiments of the present invention. As shown in FIG. 15, the repeated segment 1420 is not comprised in the example structure 1500, while segment 1410 is modified to segment 1510. At this point, the size of the optimized container image may be reduced from 263 MB to 230 MB. With embodiments of the present invention, repeated contents are removed from the optimized container image and thus further performance in processing the optimized container image with a smaller size may be increased.

Figure 16:
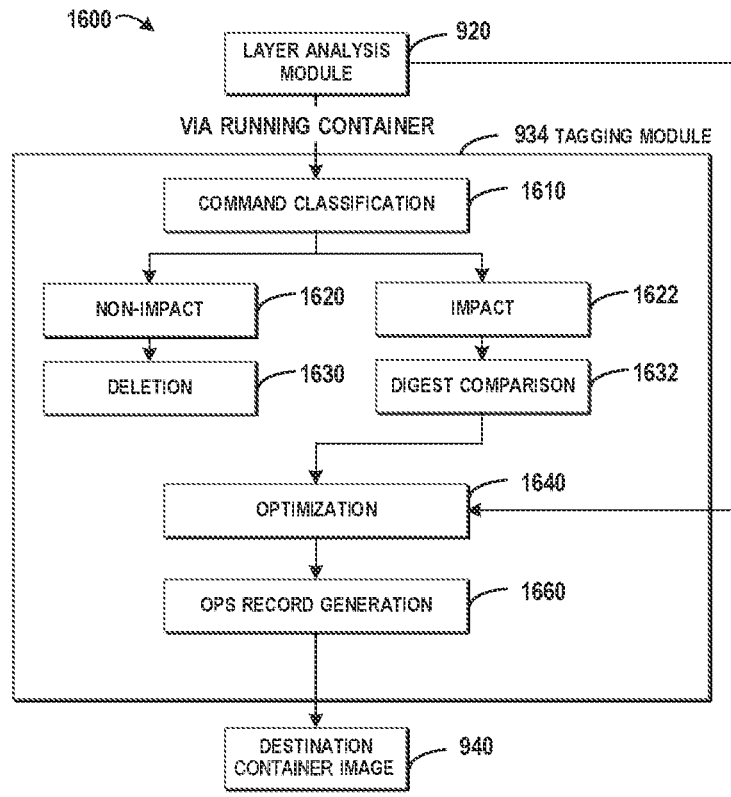
FIG. 16 depicts an example diagram for generating a destination container image by a tagging module according to embodiments of the present invention.

Having described how to process the container builder file by the evaluating module 932, hereinafter, reference will be made to FIG. 16 for a brief of the tagging module 934. According to embodiments of the present invention, the candidate resource 910 may be generated from a running container. Here, the tagging module 934 is provided for processing operations from a group of commands that are inputted in the running container. Herein, a user may run a container for editing a container image. The user may perform various commands, among which some commands may not change the container image but some commands may change the container image. For example, the user may just open and view the container image, at this point the open and view commands will not change the container image. In another example, the user may copy a file or install an application, and thus the copy and install commands may change the container image.

A new container image may be created by the container commit in the running container. However, different from creating the container image from the container builder file, the image layer created by the container commit is just a black box. No one except the user who created the new container image knows what command(s) has been executed or what has been changed in the image layer. As the time goes, even the user may forget the details. For the new container image comprising the black box layer, no detail information can be obtained from the metadata, and thus the new container image may cost more storage space and other resources in further processing.

In embodiments of the present invention, the tagging module 934 may provide a solution for recording and optimizing the user's commands. Then, an extended layer comprising more details about the user's command may be created. FIG. 16 depicts an example diagram 1600 for generating a destination container image 940 by the tagging module 934 according to embodiments of the present invention. As shown in FIG. 16, the layer analysis module 920 may be enabled if the candidate resource 910 is obtained from a running container by the image commit. When the tagging module 934 is enabled, the layer report summary 1070 may be inputted into the tagging module 934. Here, the tagging module 934 may optimize the operations via different branches.

In the running container, all the operations are commands inputted by the user, and thus hereinafter the operation is also referred to as the command. Here, the user may launch the base image to be comprised in the destination container image 940 in the running container and input some commands in the running container. In FIG. 16, at a block 1610, the inputted commands may be subject to the command classification for identifying commands that change the container image (i.e., an impact type) and commands that do not change the container image (i.e., a non-impact type). If the command is determined as the non-impact type, then a block 1620 in the left branch may be enabled. Next, the non-impact command may be directly deleted at a block 1630. Regarding the impact commands, a block 1622 in the right branch may be enabled. Further, at a block 1632, corresponding digests for the objects that are operated by the user's commands may be generated and compared each other. If the command aims at installing an application, the digest may be generated based on a version of the to-be-installed application. In another example, if the command aims at managing a node in a file system related to the destination container image 940, then the digest may be generated based on a digest of the node.

Further, the layer report summary 1070 and results of the digest comparison 1632 may be feed into a block 1640 for optimization, which may comprise both of the operation removing and combination, and then into a block 1660 for operation record generation. Afterwards, the generated operation record may be used in generating the destination container image 940. With these embodiments, embodiments of the present invention may support a way for generating the destination container image 940 from a container. Therefore, existing images that are edited by existing tools may be optimized according to embodiments of the present invention.

Figure 17:
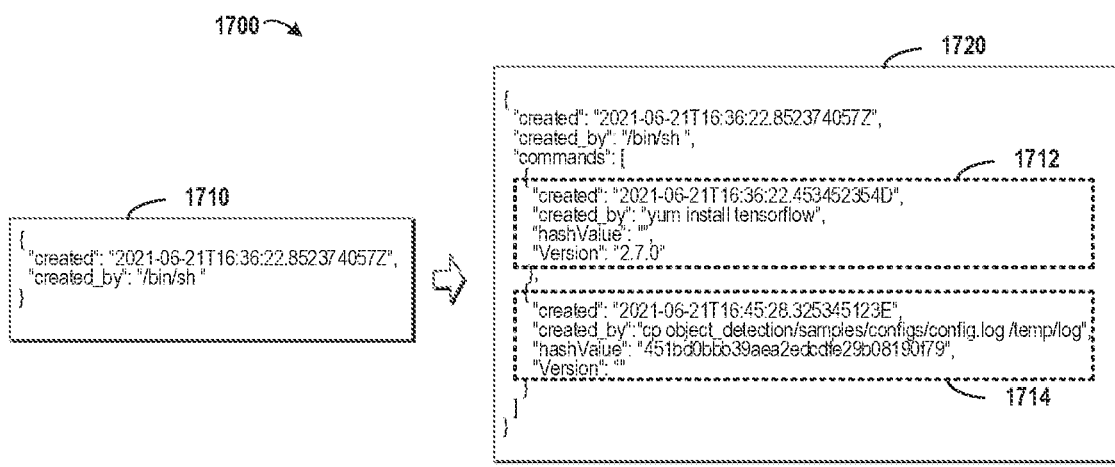
FIG. 17 depicts an example diagram for commands defining container images according to embodiments of the present invention.

Hereinafter, reference will be made to FIG. 17 to FIG. 21 for more details of the tagging module 934. FIG. 17 depicts an example diagram 1700 for commands defining container images according to embodiments of the present invention. In FIG. 17, an image layer 1710 indicates a layer in the container image created by a common container (i.e., a container using the existing container technology). As shown, the image layer 1710 provides only the base information showing that a user has implemented the container commit but fails to provide detailed commands input by the user. With the tagging module 934, the image layer 1710 is updated to an extended layer 1720, where the keyword "commands" is added for providing more details of the user's commands. For example, a segment 1712 is added to indicate that the user has installed "tensorflow" with the version of 2.7.0, and a segment 1714 is added to indicate that the user has copied an object with the hash value of "451b . . . 0f79." With the extended layer 1720, more details about the user's commands are recorded for further optimization.

Figure 18:
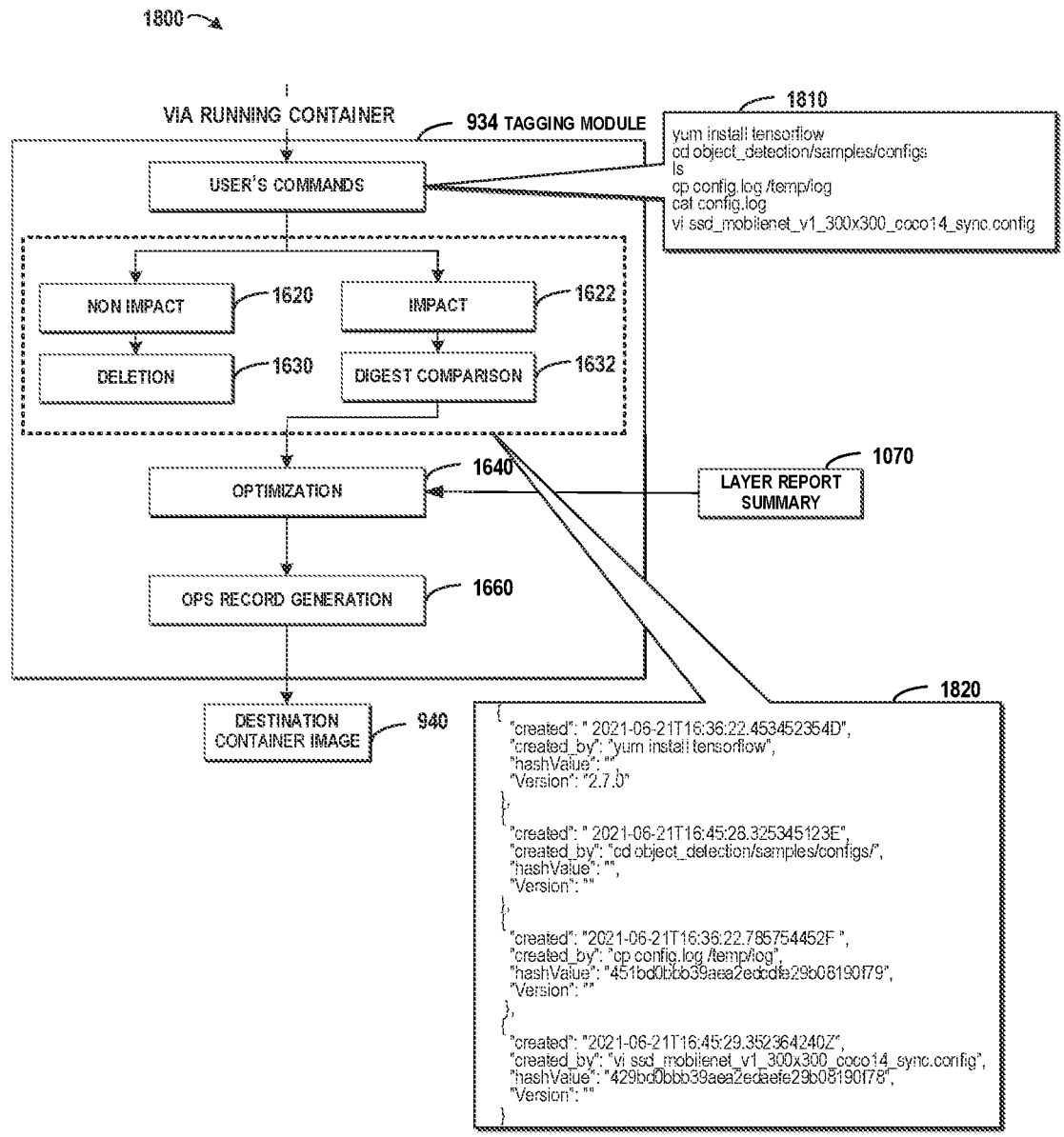
FIG. 18 depicts an example diagram for generating a destination container image by a tagging module according to embodiments of the present invention.

FIG. 18 depicts an example diagram 1800 for generating a destination container image 940 by a tagging module 934 according to embodiments of the present invention. In FIG. 18, the tagging module 934 records the user's commands 1810 that are inputted in the running container. Table 1 shows commands that are inputted by the user.

TABLE 1

| | User's Commands |
|---|---|
| No. | Command |
| 1 | yum install tensorflow |
| 2 | cd object_detection/samples/conFIGs |
| 3 | ls |
| 4 | cp conFIG.log/temp/log |
| 5 | cat conFIG.log |
| 6 | vi ssd_mobilenet_v1_300x300_coco14_sync.config |

Table 1 shows that the user has inputted six commands. Table 2 shows a relationship between the commands and attributes in the extended portion 1820. Herein, these commands may be classified into the non-impact type and the impact type, where the non-impact command may be directly deleted and the impact command is saved for generating an extended portion 1820. In Table 1, the third command "ls" and the fifth command "cat . . . " do not change the container image, and thus these two commands may be directly removed, and the other four commands are remained for further processing.

TABLE 2

| Relationship between Commands and Attributes | | |
|---|---|---|
| No | Command | Attribute |
| 1 | yum install tensorflow | {"created": " 2021-06-21T16:36:22.453452354D", "created_by": "yum install tensorflow", "hashValue": "", "Version": "2.7.0"} |
| 2 | cd object_detection/samples/conFIGs | {"created": " 2021-06-21T16:45:28.325345123E", "created_by": "cd object_detection/samples/conFIGs/", "hashValue": "", "Version": ""} |
| 3 | ls | |
| 4 | cp conFIG.log /temp/log | {"created": "2021-06-21T16:36:22.785754452F ", "created_by": "cp conFIG.log/temp/log", "hashValue": "451bd0bbb39aea2edcdfe29b08190f79", "Version": ""} |
| 5 | cat conFIG.log | |
| 6 | vi ssd_mobilenet_v1_300x300_coco14_sync.config | {"created": "2021-06-21T16:45:29.352364240Z", "created_by": "vi ssd_mobilenet_v1_300x300_coco14_sync.config", "hashValue": "429bd0bbb39aea2edaefe29b08190f78", "Version": ""} |

As shown in Table 2, regarding the impact commands, a digest (for example, based on results from the version detection 1052 or the digest computation 1054) may be generated, then these commands may be processed by optimization mechanism by aid of layer summary report 1070 to output primarily simplified attributes as shown in Table 2. Further, attributes may be further processed. For example, the version and hash value of the objects that are managed by the user's command may be added.

Figure 19:
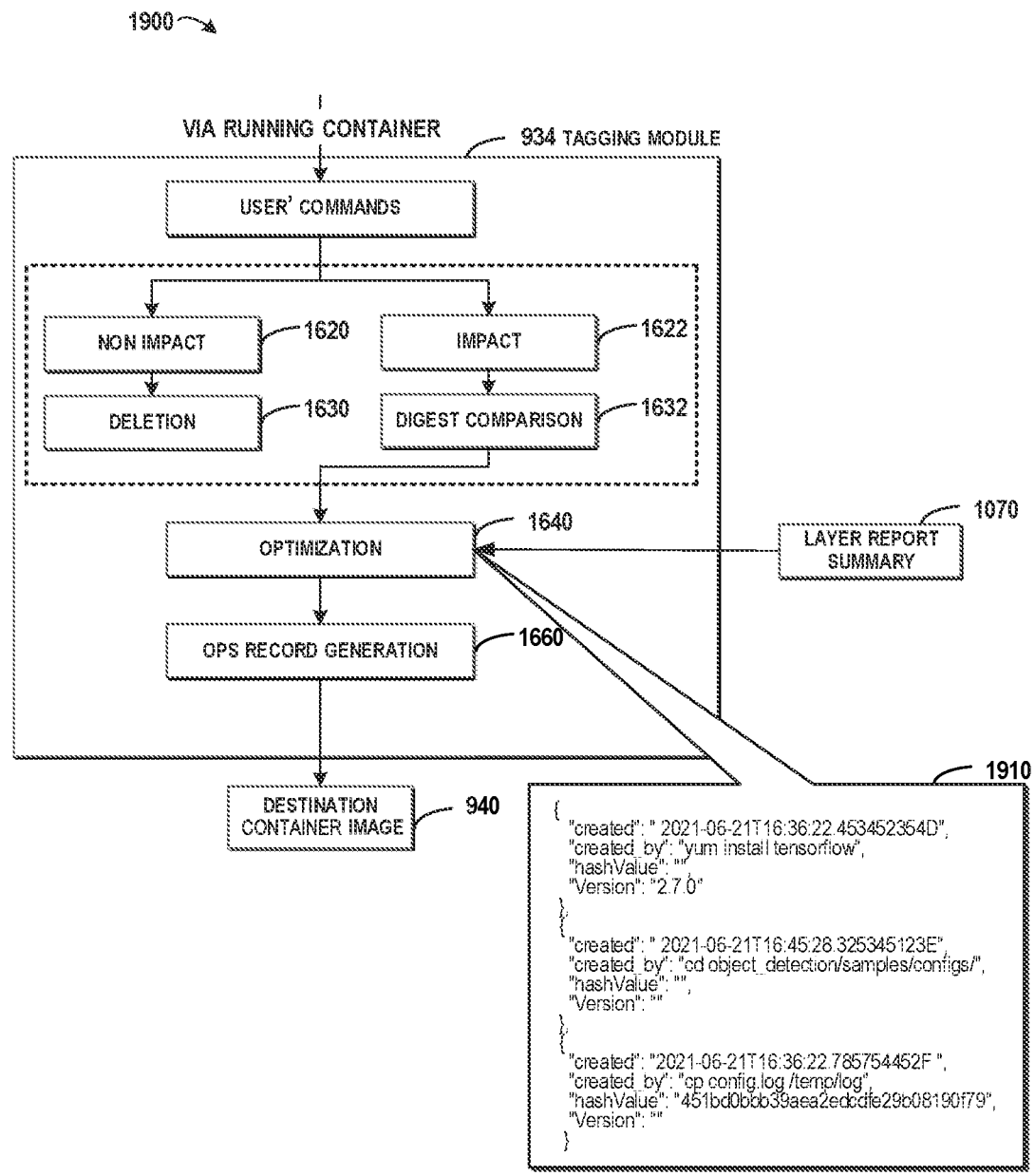
FIG. 19 depicts an example diagram for generating a destination container image by a tagging module according to embodiments of the present invention.

FIG. 19 depicts an example diagram 1900 for generating a destination container image 940 by a tagging module 934 according to embodiments of the present invention. In FIG. 19, the attributes as shown in the Table 2 may be subjected to the optimization 1640. As the digest of the "vi . . . " command is the same as that of the base image, the attribute related to "vi . . . " may be removed from the extended portion 1820. Therefore, an extended portion 1910 may be obtained after the optimization 1640.

Figure 20:
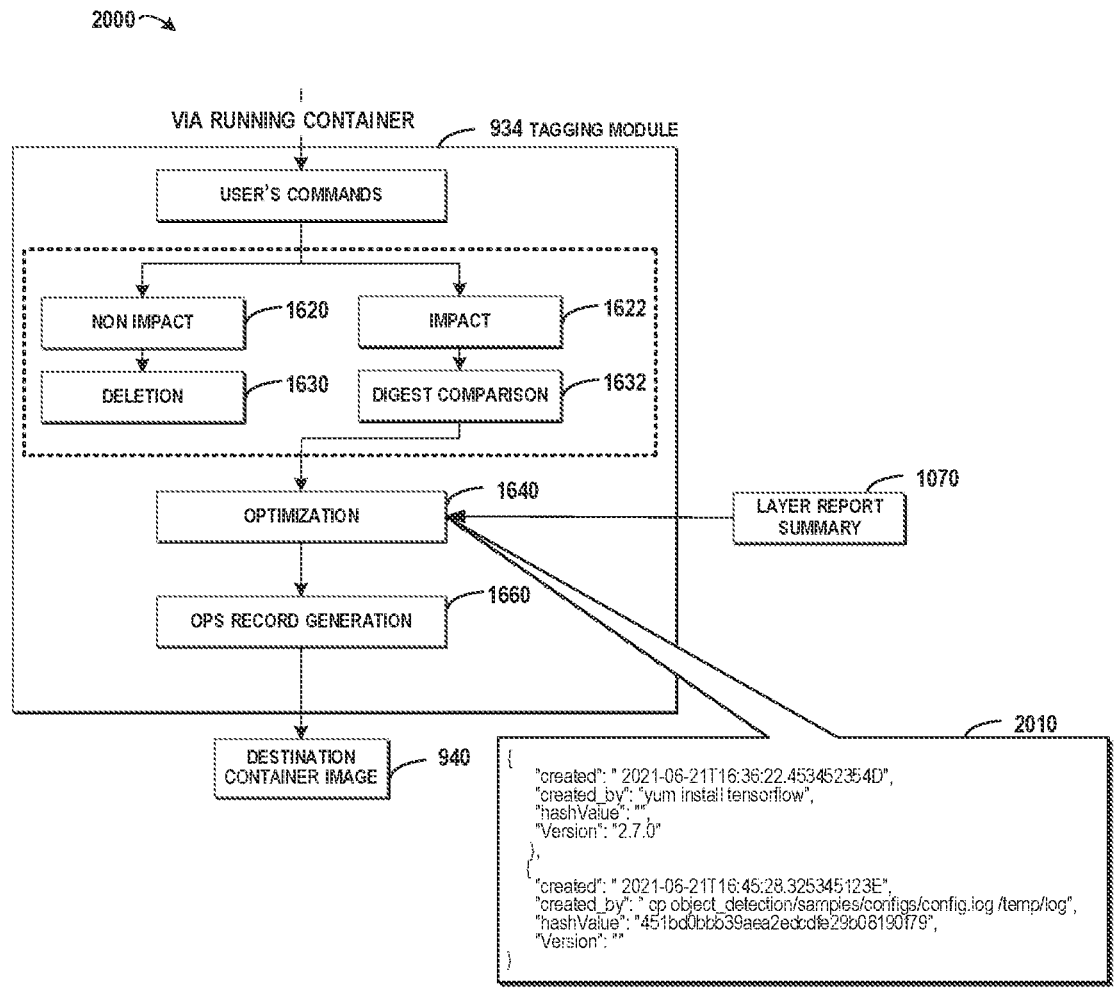
FIG. 20 depicts an example diagram for generating a destination container image by a tagging module according to embodiments of the present invention.

FIG. 20 depicts an example diagram 2000 for generating a destination container image 940 by a tagging module 934 according to embodiments of the present invention. FIG. 20 shows more details about operations combination. As the user has inputted the commands "cd . . . " and then "cp . . . ," the two commands may be combined into a single one "cp object detection/samples/conFIGs/conFIG.log/temp/log." Therefore, the extended portion 1910 may further be converted into an extend portion 2010 in the optimization 1640.

Figure 21:
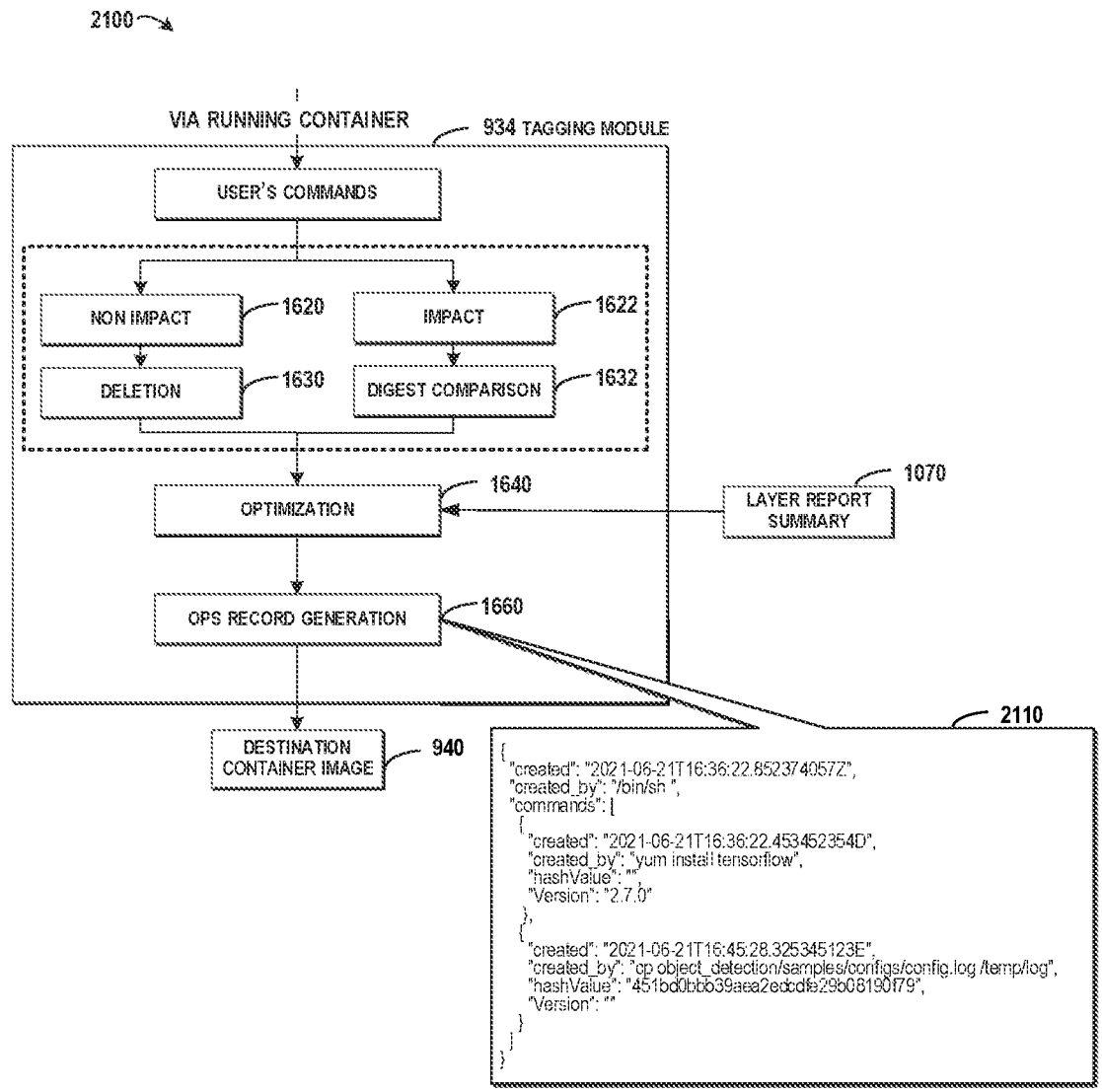
FIG. 21 depicts an example diagram for generating a destination container image by a tagging module according to embodiments of the present invention.

FIG. 21 depicts an example diagram 2100 for generating a destination container image 940 by a tagging module 934 according to embodiments of the present invention. As shown in FIG. 21, the extended portion 2010 may be added into the extend layer after the keyword "commands" and thus the original black box layer may be extended into the extended layer 2110. Further, the extended layer 2110 may be used for generating the destination container image 940. As the extended layer 2110 records all the user commands that change the container image without repeated commands, the extended layer 2110 may be further processed for generating the destination container image 940. For example, the destination container image 940 may comprise a layer of the base image and one upper layer (where upper layer comprises two operations: the first operation is for installing tensorflow, and the second operation is for the copy command). At this point, the destination container image 940 does not comprise any repeated content and thus the size of the destination container image 940 may be reduced.

Although the evaluating module 932 and/or the tagging module 934 are described in different embodiments, the above evaluating module 932 and the tagging module 934 may work together. For example, a container image may be edited by the user in a running container and a new container image may be generated by the container commit. At this point, the tagging module 934 may records the user's commands with an extend layer. Further, the new container image may be cited by another container image as a base layer, and then the extended layer may be used for extracting operations comprised in the base image. Next, the extracted operations may be compared with operations extracted from upper layers of the other container image for optimization.

In the above paragraphs, the candidate resource 910 comprising only one base image is just an example for illustration. In embodiments of the present invention, the candidate resource 910 may comprise more base images and more upper layers. Further, the base image may comprise its own base image and upper layers.

With embodiments of the present invention, the problem of repeated contents in a single container image may be solved. Especially, repeated operations between the base image and the upper layers may be removed, so as to save storage space for the container image. Further, the proposed embodiments may support various image generation scenarios: the container images generated by the container build from the container builder file, and the container images generated by the container commit in a running container.

Having described details for generating a new destination container image, the following paragraph will describe the scenario for generating the destination container image by optimizing an existing source container image. In some embodiments, a source container image may be received, here, the source container image refers to an existing container image that is generated by the existing technology. For example, the source container image may comprise repeated operations and need to be optimized.

At this point, both of the first and second groups of operations may be obtained from the source container image. For example, the first group of operations may be obtained from a base image of the source container image, and the second group of operations may be obtained from one or more upper layers in the source container image. Here, the upper layers refer to layers different from the base image of the source container image. Specifically, the source container image may be obtained from a container builder file or a container and details for obtaining the first and second operations are similar as those described in the previous paragraphs. Once the first and second groups of operations are obtained, the two groups of operations may be compared for optimizing the second group of operations, and then the destination container image may be generated based on the optimized second group of operations and the base image.

With these embodiments, there is provided a way for optimizing an existing source container image. Therefore, the repeated content comprised in the source container image may be removed in generating the destination container image. Accordingly, the source container image may be optimized into a better version excluding the repeated content and having a reduced size, such that further processing may be implemented to the destination container image effectively.

Figure 22:
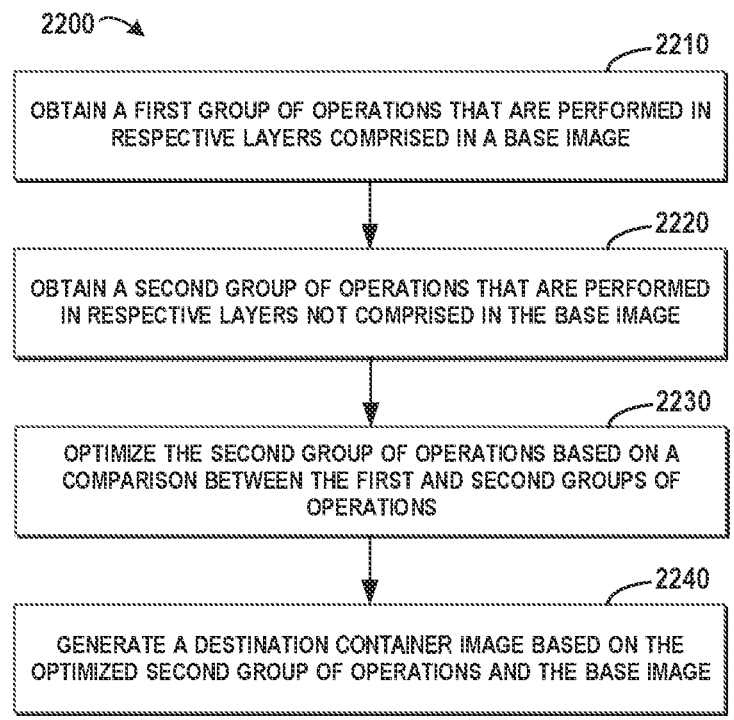
FIG. 22 depicts an example flowchart of a method for container image management according to embodiments of the present invention.

Hereinafter, reference will be made to FIG. 22 for more details about embodiments of the present invention. FIG. 22 depicts an example flowchart of a method 2200 for container image management according to embodiments of the present invention. Here, the method 2200 may be implemented by one or more processors. In FIG. 22, at a block 2210, one or more processors may obtain a first group of operations that are performed in respective layers in a base image. At a block 2220, one or more processors may obtain a second group of operations that are performed in respective layers not comprised in the base image. At a block 2230, one or more processors may optimize the second group of operations based on a comparison between the first and second groups of operations. At a block 2240, one or more processors may generate a destination container image based on the optimized second group of operations and the base image.

In some embodiments of the present invention, in order to optimize the second group of operations based on the comparison, with respect to an operation in the second group of operations, one or more processors may compare the operation with the first group of operations. Further, one or more processors may delete the operation from the second group of operations in response to the operation being repeated with one of the first group of operations.

In some embodiments of the present invention, in order to compare the operation with the first group of operations, one or more processors may classify the operation into a first type or a second type, the first type representing an operation changing the destination container image, and the second type representing an operation not changing the destination container image. One or more processors may process the two types respectively. Specifically, one or more processors may compare the operation with the first group of operations in response to the operation being classified as the first type.

Alternatively, one or more processors may delete the operation in response to the operation being classified as the second type.

In some embodiments of the present invention, in order to compare the operation with the first group of operations, one or more processors may determine a layer object digest for a layer object that is operated by the operation. One or more processors may compare the layer object digest for the layer object that is operated by the operation with each of layer object digests for a group of layer objects that are operated by the first group of operations, respectively. One or more processors may determine that the operation is repeated with one of the first group of operations in response to the layer object digest for the layer object that is operated by the operation being identical to any of the group of layer object digests for the group of layer objects that are operated by the first group of operations.

In some embodiments of the present invention, in order to determine the layer object digest for the layer object that is operated by the operation, one or more processors may determine the layer object digest based on a version of the application in response to the layer object that is operated by the operation being an application to be installed by the operation. One or more processors may determine the layer object digest based on a hash value of the node in response to the layer object that is operated by the operation being a node to be managed by the operation in a file system related to the destination container image.

In some embodiments of the present invention, in order to obtain the first group of operations, one or more processors may receive the first group of operations from a container builder file from which the destination container image is generated. Further, one or more processors may extract the second group of operations from the container builder file.

In some embodiments of the present invention, one or more processors may classify the operation of the first type into a third type or a fourth type, the third type representing an operation that produces the same result whenever the operation is performed, and the fourth type representing an operation that does not always produce the same result when the operation is performed at different time points. One or more processors may process the two types respectively. Specifically, one or more processors may collect the operation in response to the operation being classified as the third type. Alternatively, one or more processors may compare the operation with the first group of operations in response to the operation being classified as the fourth type.

In some embodiments of the present invention, in order to obtain the first group of operations, one or more processors may receive the first group of operations from a running container. One or more processors may obtain the second group of operations from a group of commands that are inputted in the running container.

In some embodiments of the present invention, in order to optimize the second group of operations based on the comparison, one or more processors may determine a plurality of operations in the second group of operations that have an association relationship based on the comparison. One or more processors may combine the plurality of operations into a new operation, and replace the plurality of operations in the second group of operations with the new operation.

In some embodiments of the present invention, the one or more processors may receive a source container image from which the destination container image is generated. Further, in order to obtain the first group of operations, the one or more processors may obtain the first group of operations from a base image of the source container image. In order to obtain the second group of operations, the one or more processors may obtain the second group of operations in the source container image.

In another aspect of the present invention, there is provided a computer-implemented system. The computer-implemented system comprises a computer processor coupled to a computer-readable memory unit, where the memory unit comprises instructions that when executed by the computer processor implements the above method 2200.

In another aspect of the present invention, there is provided a computer program product. The computer program product comprises a computer readable storage medium having program instructions embodied therewith. The program instructions are executable by an electronic device to cause the electronic device to perform actions of the above method 2200.

The present invention may be a system, a method, and/or a computer program product at any possible technical detail level of integration. The computer program product may comprise a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium comprises the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, comprising an object oriented programming language such as Smalltalk, C++, or so on, and procedural programming languages, such as the "C" programming language or similar programming languages. The computer readable program instructions may execute entirely on the user's computer, partly on the user's computer, as a stand-alone software packet, partly on the user's computer and partly on a remote computer or entirely on the remote computer or server. In the latter scenario, the remote computer may be connected to the user's computer through any type of network, comprising a local area network (LAN) or a wide area network (WAN), or the connection may be made to an external computer (for example, through the Internet using an Internet Service Provider). In some embodiments, electronic circuitry comprising, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture comprising instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    obtaining, by one or more processors, a first group of operations that are performed in respective layers comprised in a base image;
    obtaining, by one or more processors, a second group of operations that are performed in respective layers not comprised in the base image;
    optimizing, by one or more processors, the second group of operations based on a comparison between the first and second groups of operations;
    in response to an operation of the second group of operations being repeated within the first group of operations, classifying, by one or more processors, the operation into a first type or a second type, the first type representing an operation changing the destination container image, and the second type representing an operation not changing the destination container image;
    in response to the operation being classified as the first type, comparing, by one or more processors, the operation with the first group of operations;
    in response to the operation being classified as the second type, deleting, by one or more processors, the operation from the second group; and
    generating, by one or more processors, a destination container image based on the optimized second group of operations and the base image.

2. The method of claim 1, wherein the comparing the operation with the first group of operations comprises:
    determining, by one or more processors, a layer object digest for a layer object that is operated by the operation;
    comparing, by one or more processors, the layer object digest for the layer object that is operated by the operation with each of layer object digests for a group of layer objects that are operated by the first group of operations, respectively; and
    in response to the layer object digest for the layer object that is operated by the operation being identical to any of the group of layer object digests for the group of layer objects that are operated by the first group of operations, determining, by one or more processors, that the operation is repeated with one of the first group of operations.

3. The method of claim 1, wherein the determining the layer object digest for the layer object that is operated by the operation comprises:
   in response to the layer object that is operated by the operation being an application to be installed by the operation, determining, by one or more processors, the layer object digest based on a version of the application; or
   in response to the layer object that is operated by the operation being a node to be managed by the operation in a file system related to the destination container image, determining, by one or more processors, the layer object digest based on a digest of the node.

4. The method of claim 1, wherein the obtaining the first group of operations comprises:
   receiving, by one or more processors, the first group of operations from a container builder file from which the destination container image is generated; and
   wherein the obtaining the second group of operations comprises: extracting, by one or more processors, the second group of operations from the container builder file.

5. The method of claim 4, further comprising:
   classifying, by one or more processors, the operation of the first type into a third type or a fourth type, the third type representing an operation that produces the same result whenever the operation is performed, and the fourth type representing an operation that does not always produce the same result when the operation is performed at different time points; and
   implementing, by one or more processors, at least one from a group consisting of:
      in response to the operation being classified as the third type, collecting, by one or more processors, the operation; and
      in response to the operation being classified as the fourth type, comparing the operation with the first group of operations.

6. The method of claim 1, wherein the obtaining the first group of operations comprises: receiving, by one or more processors, the first group of operations from a running container; and wherein the obtaining the second group of operations comprises: obtaining, by one or more processors, the second group of operations from a group of commands that are inputted in the running container.

7. The method of claim 1, wherein the optimizing the second group of operations based on the comparison comprises:
   determining, by one or more processors, a plurality of operations in the second group of operations that have an association relationship based on the comparison;
   combining, by one or more processors, the plurality of operations into a new operation; and
   replacing, by one or more processors, the plurality of operations in the second group of operations with the new operation.

8. The method of claim 1, further comprising: receiving a source container image from which the destination container image is generated, wherein the obtaining the first group of operations comprises: obtaining the first group of operations from a base image of the source container image; and wherein the obtaining the second group of operations comprises: obtaining the second group of operations in the source container image.

9. A computer program product comprising:
   one or more computer-readable storage media and program instructions stored on the one or more computer-readable storage media, the program instructions comprising:
      program instructions to obtain a first group of operations that are performed in respective layers comprised in a base image;
      program instructions to obtain a second group of operations that are performed in respective layers not comprised in the base image;
      program instructions to optimize the second group of operations based on a comparison between the first and second groups of operations;
      program instructions, in response to an operation of the second group of operations being repeated within the first group of operations, to classify the operation into a first type or a second type, the first type representing an operation changing the destination container image, and the second type representing an operation not changing the destination container image;
      program instructions, in response to the operation being classified as the first type, to compare the operation with the first group of operations;
      program instructions, in response to the operation being classified as the second type, to delete the operation from the second group; and
      program instructions to generate a destination container image based on the optimized second group of operations and the base image.

10. The computer program product of claim 9, wherein the program instructions to optimize the second group of operations based on the comparison comprises:
    program instructions to determine a plurality of operations in the second group of operations that have an association relationship based on the comparison;
    program instructions to combine the plurality of operations into a new operation; and
    program instructions to replace the plurality of operations in the second group of operations with the new operation.

11. A computer system comprising:
    one or more computer processors;
    one or more computer readable storage media; and
    program instructions stored on the computer readable storage media for execution by at least one of the one or more processors, the program instructions comprising:
       program instructions to obtain a first group of operations that are performed in respective layers comprised in a base image;
       program instructions to obtain a second group of operations that are performed in respective layers not comprised in the base image;
       program instructions to optimize the second group of operations based on a comparison between the first and second groups of operations;
       program instructions, in response to an operation of the second group of operations being repeated within the first group of operations, to classify the operation into a first type or a second type, the first type representing an operation changing the destination container image, and the second type representing an operation not changing the destination container image;

program instructions, in response to the operation being classified as the first type, to compare the operation with the first group of operations;

program instructions, in response to the operation being classified as the second type, to delete the operation from the second group; and program instructions to generate a destination container image based on the optimized second group of operations and the base image.

12. The computer system of claim 11, wherein the program instructions to optimize the second group of operations based on the comparison comprises:

program instructions to determine a plurality of operations in the second group of operations that have an association relationship based on the comparison;

program instructions to combine the plurality of operations into a new operation; and program instructions to replace the plurality of operations in the second group of operations with the new operation.

13. The computer system of claim 4, wherein the obtaining the first group of operations comprises:

program instructions to receive the first group of operations from a container builder file from which the destination container image is generated; and wherein the obtaining the second group of operations comprises: program instructions to extract the second group of operations from the container builder file.

14. The computer system of claim 11, wherein the program instructions to obtain the first group of operations comprises:

program instructions to receive the obtaining the first group of operations from a running container; and wherein the obtaining the second group of operations comprises: program instructions to obtain the second group of operations from a group of commands that are inputted in the running container.

15. The computer system of claim 11, the program instructions further comprising:

program instructions to classify the operation of the first type into a third type or a fourth type, the third type representing an operation that produces the same result whenever the operation is performed, and the fourth type representing an operation that does not always produce the same result when the operation is performed at different time points; and program instructions to implement at least one from a group consisting of:

in response to the operation being classified as the third type, collecting the operation; and in response to the operation being classified as the fourth type, comparing the operation with the first group of operations.

16. The computer system of claim 11, wherein the program instructions to compare the operation with the first group of operations comprises:

program instructions to determine a layer object digest for a layer object that is operated by the operation;

program instructions to compare the layer object digest for the layer object that is operated by the operation with each of layer object digests for a group of layer objects that are operated by the first group of operations, respectively; and program instructions to, in response to the layer object digest for the layer object that is operated by the operation being identical to any of the group of layer object digests for the group of layer objects that are operated by the first group of operations, determine that the operation is repeated with one of the first group of operations.

17. The computer system of claim 16, wherein the program instructions to obtain the first group of operations comprises:

program instructions to receive the first group of operations from a container builder file from which the destination container image is generated; and wherein the program instructions to obtain the second group of operations comprise:

program instructions to extract the second group of operations from the container builder file.

* * * * *